US009578604B2

United States Patent
Chen et al.

(10) Patent No.: US 9,578,604 B2
(45) Date of Patent: Feb. 21, 2017

(54) POWER ALLOCATION METHOD FOR TRANSMITTING SCALABLE VIDEO OVER MIMO SYSTEM

(71) Applicant: NATIONAL SUN YAT-SEN UNIVERSITY, Kaohsiung (TW)

(72) Inventors: Xiang Chen, Kaohsiung (TW); Jenq-Neng Hwang, Kaohsiung (TW); Chung-Nan Lee, Kaohsiung (TW)

(73) Assignee: NATIONAL SUN YAT-SEN UNIVERSITY, Kaohsiung (TW)

( * ) Notice: Subject to any disclaimer, the term of this patent is extended or adjusted under 35 U.S.C. 154(b) by 210 days.

(21) Appl. No.: 14/519,286

(22) Filed: Oct. 21, 2014

(65) Prior Publication Data
US 2015/0358919 A1    Dec. 10, 2015

(30) Foreign Application Priority Data
Jun. 4, 2014  (TW) .............................. 103119461 A

(51) Int. Cl.
*H04W 4/00* (2009.01)
*H04W 52/20* (2009.01)
(Continued)

(52) U.S. Cl.
CPC .......... *H04W 52/20* (2013.01); *H04B 7/0434* (2013.01); *H04L 1/00* (2013.01); *H04N 1/00* (2013.01); *H04W 52/42* (2013.01)

(58) Field of Classification Search
CPC ...... H04W 52/20; H04W 72/0473; H04L 1/00
See application file for complete search history.

(56) References Cited

U.S. PATENT DOCUMENTS 6,848,065 B1   1/2005  Nilsson
7,983,352 B2   7/2011  Li et al.
(Continued)

OTHER PUBLICATIONS

Antonio Pascual-Iserte et al., On Power Allocation Strategies for Maximum Signal to Noise and Interference Ratio in a OFDM-MIMO System, IEEE Transactions on Wireless Communications, vol. 3, No. 3, May 2004, pp. 308-820.
(Continued)

*Primary Examiner* — Marsha D Banks Harold
*Assistant Examiner* — Elton Williams
(74) *Attorney, Agent, or Firm* — Jackson IPG PLLC; Demian K. Jackson

(57) ABSTRACT

A power-allocation method for scalable video transmission over MIMO system includes: encoding a video sequence into L layers; performing MCSs to the layers and estimating bit error rate or symbol error rate respectively for each of the layers after MCSs procedure based on channel quality feedbacks from the receiver side; performing power allocations of L sub-problems and obtaining candidate power allocation solution of each of the sub-problems respectively based on bit error rate or symbol error rate of each of the layers and derivative of bit error rate or symbol error rate of each of the layers; and choosing one of the candidate power allocation solution with the largest quality of experiences as the power allocation of the scalable video transmission over MIMO system. This invention considers transmission-error-rate of PHY layer and video coding structure of APP layer and optimizes quality of experiences at user end with cross-layer design.

14 Claims, 7 Drawing Sheets

(51) Int. Cl.
*H04L 1/00* (2006.01)
*H04N 1/00* (2006.01)
*H04B 7/04* (2006.01)
*H04W 52/42* (2009.01)

(56) References Cited

U.S. PATENT DOCUMENTS

| | | |
|---|---|---|
| 8,397,110 B2 | 3/2013 | Simmons et al. |
| 8,630,310 B2 * | 1/2014 | Sethakaset ......... H04B 7/15592 370/259 |
| 2004/0171359 A1 | 9/2004 | Tirkkonen et al. |
| 2006/0200710 A1 | 9/2006 | Webb et al. |

OTHER PUBLICATIONS

Taiwanese Notice of Allowance mailed Apr. 28, 2016 for Taiwanese Patent Application No. 103119461, 3 pages.

* cited by examiner

| Type | Modulation | Code rate | $a_k$ | $b_k$ |
|---|---|---|---|---|
| 1 | BPSK | 1/2 | 1.1369 | 7.5556 |
| 2 | QPSK | 1/2 | 0.3351 | 3.2543 |
| 3 | QPSK | 3/4 | 0.2197 | 1.5244 |
| 4 | 16 QAM | 9/16 | 0.2081 | 0.6250 |
| 5 | 16 QAM | 3/4 | 0.1936 | 0.3484 |
| 6 | 64 QAM | 3/4 | 0.1887 | 0.0871 |

FIG. 5

POWER ALLOCATION METHOD FOR TRANSMITTING SCALABLE VIDEO OVER MIMO SYSTEM

FIELD OF THE INVENTION

The present invention is generally relating to a power allocation method, more particularly to the power allocation method for a scalable video transmission over MIMO system.

BACKGROUND OF THE INVENTION

Due to rapid increasing demands of wireless multimedia applications, plenty of videos are transmitted through wireless channels. However, error-prone and band-limited nature of wireless communication usually lead to high packet loss/error rate, delay or jitter, which influence the quality of experiences at the user ends.

Accordingly, a scalable video coding technique takes emphasis in recent years. The scalable video coding encodes video into multiple layers in accordance with spatial, temporal and quality scalabilities. The feature of the scalable video coding is that parts of the stream can be removed in a way that the resulting sub-stream forms another valid bit stream for some target decoder. Besides, the scalability nature of the scalable video coding provides hierarchical decoding qualities based on user demands, hardware specifications and network qualities. When the scalable coding is applied to MIMO (multi-input multi-output) system, through selection of channels and power allocation, the decoding quality of transmitted video can be effectively increased. In power allocation, equal power allocation and water-filling algorithm are common algorithms. However, equal power is not able to raise the decoding quality of transmitted video effectively. Water-filling algorithm is optimal in terms of system capacity but not user experience when video transmissions are considered.

SUMMARY

The primary objective of the present invention is to efficiently allocate transmission power based on quality of experience (QoE), which is proportional to bit error rate or symbol error rate at different channel qualities when different modulation and coding schemes are considered. Besides, due to the complexity of the primary optimization problem, the present invention decomposes the primary problem into several sub-problems and obtains candidate power allocation solution set by solving the sub-problems. Finally, the optimal solution can be found by choosing the best candidate solution with largest video decoding quality at user end.

A power-allocation method for transmitting scalable video over MIMO system includes: encoding a video sequence into L layers; performing modulation and coding schemes (MCSs) to the layers and generating a bit error rate or a symbol error rate respectively for each of the layers after MCSs procedure; decomposing the original problem into L sub-problems and obtaining a candidate power allocation solution by solving each of the sub-problems respectively based on the bit error rate or the symbol error rate of each of the layers and derivative of the bit error rate or the symbol error rate of each of the layers, wherein each of the sub-problems allows up to l (l=1, 2, . . . , L) layers to proceed transmission respectively; and selecting the candidate power allocation solution with the largest quality of experience as the final optimal power allocation solution of the scalable video transmission over MIMO system, wherein the expression of the optimal power allocation of the scalable video transmission over MIMO system is:

$$p^* = \underset{\{p_1^*, \ldots, p_l^*, \ldots, p_L^*\}}{\arg\max} \sum_{k=1}^{L} u_k \tilde{f}_k(p_l^*)$$

wherein $p^*$ is the optimized power allocation of the scalable video transmission over MIMO system, $u_k$, is utility of the $k_{th}$ layer, $\tilde{f}_k(\bullet)$ is the frame correction rate of the $k_{th}$ layer, and $p_l^*$ is the optimized power allocation candidate solution of the $l_{th}$ sub-problem.

The present invention considers both transmission-error-rate of PHY layer and video coding structure (the inter-layer dependency of SVC based video) of APP layer and optimizes quality of experiences (QoEs) at user end with cross-layer design. Besides, due to the complexity of the primary optimization problem, the power-allocation method for the scalable video transmission over MIMO system decomposes the original primary problem into several sub-problems, each of which can be solved by classical convex optimization methods. The candidate solution set can be obtained by solving the sub-problems and the optimal solution of the original problem is found by choosing the best candidate solution with the largest system utility. Eventually, the candidate solution with the largest system utility is selected as the optimal power allocation solution of the system.

DESCRIPTION OF THE DRAWINGS

FIG. 5 is a parameter related to modulation-and-coding-schemes in accordance with an embodiment of the present invention.

DETAILED DESCRIPTION OF THE INVENTION

Figure 1:
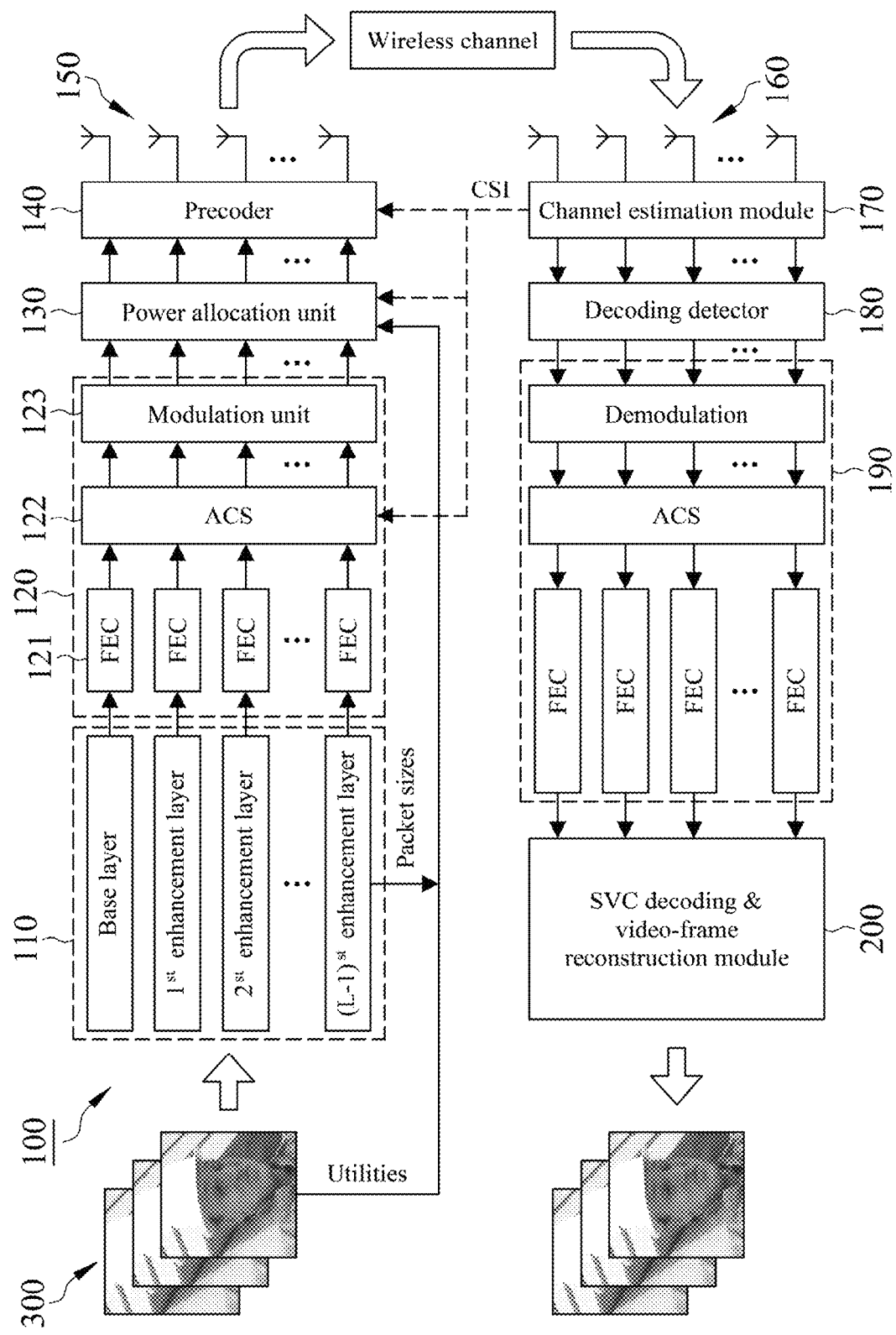
FIG. 1 is a diagram illustrating a scalable video transmission over MIMO system in accordance with an embodiment of the present invention.

With reference to FIG. 1, an MIMO system 100 transmitting an scalable video in accordance with an embodiment of the present invention includes an scalable video encoding module 110, a modulation-and-coding-schemes module 120, a power allocation unit 130, a precoder 140, a plurality of transmitting antennas 150, a plurality of receiving antennas 160, a channel estimation module 170, a decoding detector 180, a demodulation-and-decoding-schemes module 190 and an scalable-video decoding and video-frame reconstruction module 200. The video encoding module 110 is used for encoding a video sequence 300 into a plurality of layers, wherein the layers includes a base layer and L−1 enhancement layers. The modulation-and-coding-schemes module 120 comprises a plurality of forward error-correction encoders 121, an adaptive channel selection unit 122 and a modulation unit 123, wherein the forward error-correction encoders 121 proceed modulation to each of the layers respectively, the adaptive channel selection unit 122 is used for making high-priority layers allocate to the space channel with higher signal to noise ratio (SNR), and the modulation unit 123 is used for proceeding modulation to the layers. The power allocation unit 130 is used for proceeding appropriate power allocation. The layers are pre-encoded via the precoder 140, wherein the pre-encoded layers are transmitted to the receiving antennas 160 via the transmitting antennas 150 and wireless channel. The channel estimation module 170 receives signals and thereafter feedbacks channel state information to the adaptive channel selection unit 122, the power allocation unit 130 and the precoder 140. The signals received by the receiving antennas 160 are recombined into video sequences via decoding and detection of the decoding detector 180, demodulation, channel selection, and decoding of the demodulation-and-decoding-schemes module 190, and decoding/reconstruction of the scalable-video decoding and video-frame reconstruction module 200.

Owing to error-prone nature of wireless channel, the transmission of the signals likely generates bit errors or symbol errors. The primary objective of the present invention is to optimize the quality of experiences at the receiving end. The primary problem of the present invention represents:

$$\max_{p} \sum_{l=1}^{L} u_l \tilde{f}_l(p) \quad (1)$$

$$\text{subject to } p_k \geq 0; \sum_{k=1}^{L} p_k = 1,$$

$u_l$ is utility of the $l_{th}$ layer, $\tilde{f}_l(p)$ is the frame correction rate of the $l_{th}$ layer, wherein the frame correction rate of the $l_{th}$ layer represents:

$$\tilde{f}_l(p) = \prod_{k=1}^{l} (1 - Pe_k(p_k))^{s_k}$$

wherein $Pe_k(p_k)$ is the bit error rate or the symbol error rate of the $k_{th}$ layer, $s_k$ is the total amount of bits or symbols of a single group of pictures (GOP) of the $k_{th}$ layer. By the above two expressions, the most direct method for optimizing quality of experiences over receiving end is to decrease average bit error rate or the symbol error rate of each layer to the lowest value, wherein the bit error rate or the symbol error rate of layer are related to its corresponding modulation and coding scheme and channel quality.

Besides, the original primary problem in Eq. (1) is too complex to be directly solved. Therefore, the present invention decomposes the primary problem into L sub-problems, and each of the sub-problems permits l layers to proceed transmission respectively, wherein l=1, 2, . . . L, and the $l_{th}$ sub-problem represents:

$$\min_{p} -\log(\tilde{f}_l(p)) = -\sum_{k=1}^{l} s_k \log(1 - Pe_k(p_k))$$

$$\text{subject to } p_k \geq 0; \sum_{k=1}^{l} p_k = 1$$

wherein in the $l_{th}$ sub-problem $p_{l+1}=p_{l+2}=\ldots=p_L=0$, which means the transmission power is concentrated in the layers that are allowed to be transmitted. The optimal solution of the primary problem can be found as:

$$p^* = \underset{\{p_1^*, \ldots, p_l^*, \ldots, p_L^*\}}{\arg\max} \sum_{k=1}^{L} u_k \tilde{f}_k(p_l^*)$$

wherein p* is the optimized power allocation of the scalable video transmission over MIMO system 100, $p_l^*$ is the optimized power allocation of the $l_{th}$ sub-problem, that is to say, the optimal power allocation solution for scalable video transmissions over MIMO system 100 is obtained by choosing one of the candidate power allocation solutions with the largest utility value (or equivalently, quality of experience). Since each sub-problem can be solved by classical convex optimization methods, the complexity of the original primary problem can be much reduced.

Since each sub-problem is convex, the point satisfying the Karush-Kuhn-Tucker (KKT) conditions is global optimal in that sub-problem. Therefore, the candidate solution of the $l_{th}$ sub-problem can be obtained by finding the point p that satisfying the KKT conditions. The Lagrangian of the $l_{th}$ sub-problem is:

$$L_l(p, \xi, \upsilon) = -\sum_{k=1}^{l} s_k \log(1 - Pe_k(p_k)) - \sum_{k=1}^{l} \xi_k p_k + \upsilon\left(\sum_{k=1}^{l} p_k - 1\right)$$

wherein $\xi$ and $\upsilon$ are the Lagrange multiplier. The Karush-Kuhn-Tucker (KKT) condition is expressed as:

1. $p_k^* \geq 0; \sum p_k^* = 1$,

2. $\xi_k^* \geq 0$,

3. $\xi_k^* p_k^* = 0$,

4. $\dfrac{\partial L_l(p, \xi, \upsilon)}{\partial p_k}\bigg|_{p_k^*, \xi_k^*, \upsilon^*} = \dfrac{s_k Pe_k'(p_k^*)}{1 - Pe_k(p_k^*)} - \xi_k^* + \upsilon^* = 0$, by mentioned KKT condition, we may obtain:

$$\upsilon^* \geq \frac{s_k Pe_k'(p_k^*)}{1 - Pe_k(p_k^*)}, \text{ and}$$

$$\left(\frac{s_k Pe_k'(p_k^*)}{1 - Pe_k(p_k^*)} + \upsilon^*\right) p_k^* = 0,$$

here we consider $p_k^* > 0$ only, accordingly, $p_k^* = 0$ can be solved by the $k-1_{th}$ sub-problem therefore obtaining:

$$v^* = \frac{1}{h_k(p_k^*)} = -\frac{s_k Pe_k'(p_k^*)}{1 - Pe_k(p_k^*)}$$

wherein $Pe_k'(p_k^*)$ is derivative of the bit error rate or the symbol error rate of the $k_{th}$ layer.

The bit error rate or the symbol error rate of each of the layers and derivative of the bit error rate or the symbol error rate relate to the use of the modulation-and-coding schemes method. The method of the present invention, each of the layers proceeds modulation-and-coding schemes by M-QAM and M-QAM with (N, K, N−K+1) RS codes or modulation and coding schemes in the communication standards.

Once each of the layers is modulated by M-QAM, the bit error rate of each of the layers represents:

$$Pe_k(p_k) \approx \frac{2(1 - M_k^{-0.5})}{\log_2(\sqrt{M_k})}\left(1 - \Phi\left(\sqrt{\left(\frac{3}{M_k - 1}\right)\rho\lambda_k p_k}\right)\right)$$

wherein $M_k$ is the constellation-point number of the $k_{th}$ layer, $\Phi(\bullet)$ is the cumulative distribution function, $\rho\lambda_k$ is the channel gain of the $k_{th}$ layer, and derivative of the bit error rate represents:

$$Pe_k'(p_k) \approx -\frac{(1 - M_k^{-0.5})e^{-\frac{3\rho\lambda_k p_k}{2(M_k-1)}}}{\log_2(\sqrt{M_k})}\sqrt{\frac{3\rho\lambda_k}{2\pi(M_k - 1)p_k}}.$$

Once each of the layers proceeds modulation-and-coding schemes by M-QAM with (N, K, N−K+1) RS codes, wherein N is the block length, K is the message length, N−K+1 is the minimum Hamming distance, and the symbol error rate of each of the layers represents:

$$Pe_k(p_k) = \frac{1}{N}\sum_{i=t+1}^{N} i\binom{N}{i}(P_{M_k}(p_k))^i(1 - P_{M_k}(p_k))^{N-i},$$

$$P_{M_k}(p_k) = 1 - \left(1 - 2(1 - M_k^{-0.5})Q\left(\sqrt{\frac{3\rho\lambda_k p_k}{M_k - 1}}\right)\right)^{\frac{2n}{\log_2(M_k)}},$$

wherein $M_k$ is the constellation-point number of the $k_{th}$ layer, $\rho\lambda_k$ is the channel gain of the $k_{th}$ layer, $t=(N-K)/2$, and $Q(\bullet)$ is the complementary error function. Derivative of the symbol error rate represents:

$$Pe_k'(p_k) = \sum_{j=t}^{N-1} \frac{P_{M_k}'(p_k)\binom{N-1}{j}(j+1 - NP_{M_k}(p_k))}{(1 - P_{M_k}(p_k))^{j-N+2}P_{M_k}(p_k)^{-j}},$$

$$P_{M_k}'(p_k) = \frac{2nPs_k'(p_k)(1 - Ps_k(p_k))^{\frac{2n}{\log_2(M_k)}-1}}{\log_2(M_k)},$$

$$Ps_k'(p_k) = -(1 - M_k^{-0.5})e^{\frac{3\rho\lambda_k p_k}{2(M_k-1)}}\sqrt{\frac{3\rho\lambda_k}{2\pi(M_k - 1)p_k}},$$

$$Ps_k(p_k) = 2(1 - M_k^{-0.5})Q\left(\sqrt{\frac{3\rho\lambda_k p_k}{M_k - 1}}\right).$$

Once each of the layers proceeds modulation by modulation and coding in each communication standard, the communication standard is selectable from 3GPP, HIPERLAN/2, IEEE 802.11a or IEEE 802.16, and the bit error rate of each of the layers represents:

$$Pe_k(p_k) = a_k e^{-b_k \rho \lambda_k p_k}.$$

wherein $a_k$ and $b_k$ are coefficients related to modulation and coding schemes (MCSs) used by the $k_{th}$ layer, and the corresponding MCSs of the coefficients is shown in FIG. 5, $\rho\lambda_k$ is the channel gain of the $k_{th}$ layer, wherein derivative of the bit error rate for each of the layers proceeding MCSs procedure by modulation and coding in each communication standard represents:

$$Pe_k'(p_k) = -a_k b_k \rho\lambda_k e^{-b_k \rho\lambda_k p_k}.$$

Figure 2:
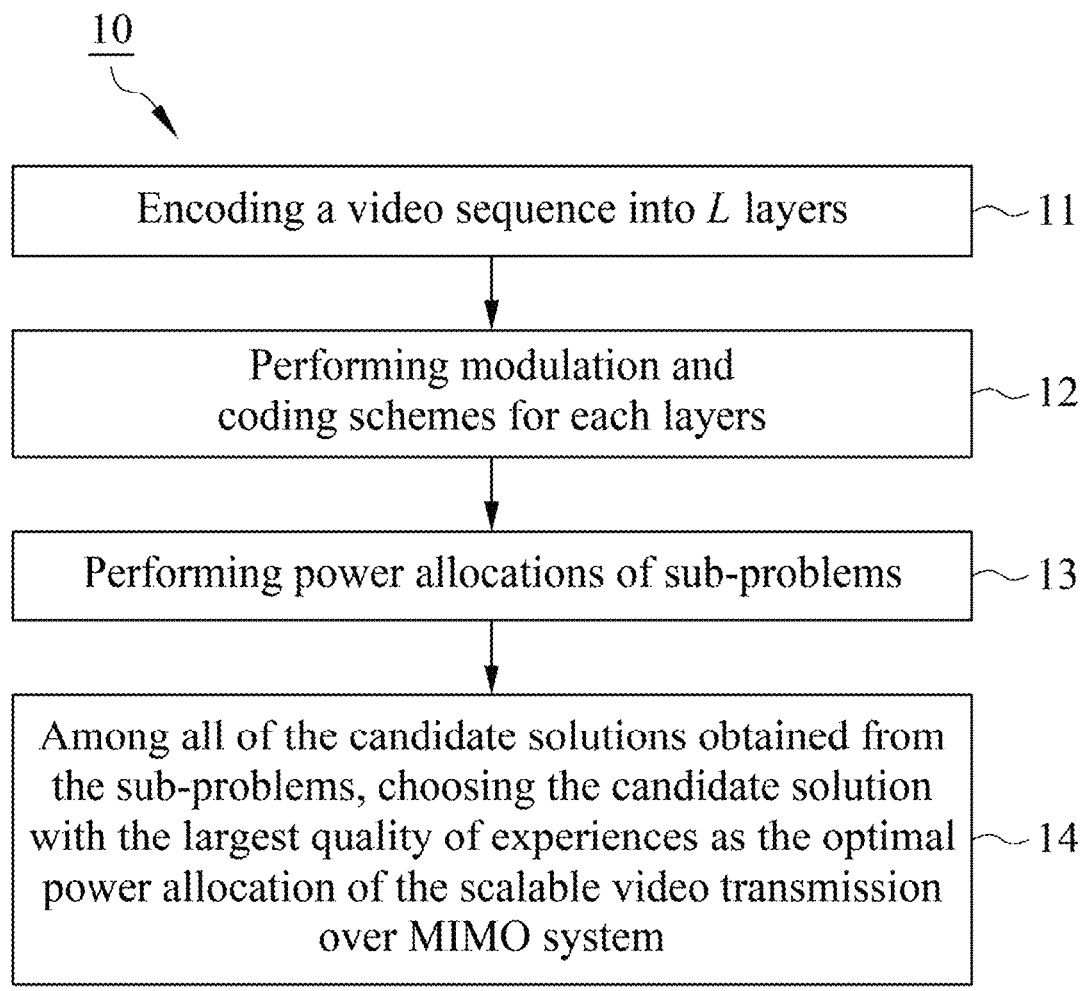
FIG. 2 is a flow chart illustrating a power-allocation method for the scalable video transmission over MIMO system in accordance with the embodiment of the present invention.
Figure 3:
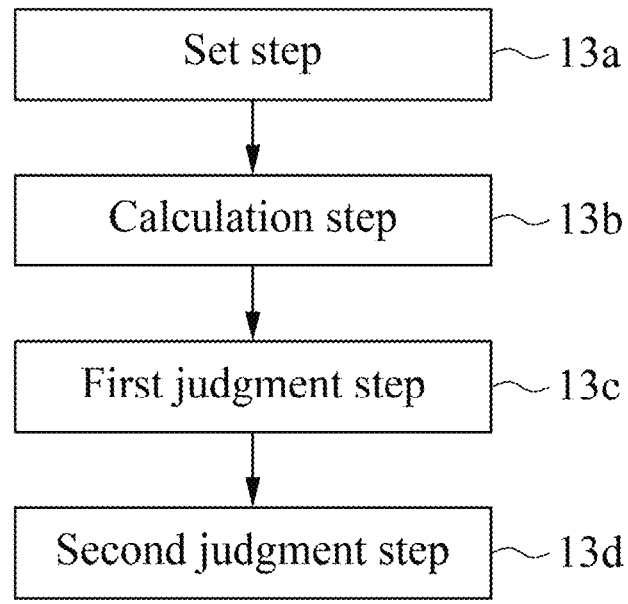
FIG. 3 is a flow chart illustrating a sub-problem of power allocation method in accordance with the first embodiment of the present invention.

With reference to FIGS. 2 and 3, the power-allocation method for transmitting scalable video over MIMO system 10 in the present invention includes: encoding a video sequence into L layers 11; performing modulation and coding schemes (MCSs) for each of the layers 12; performing power allocations of sub-problems 13; and among all of the candidate solutions obtained from the sub-problems, choosing the candidate solution with the largest quality of experiences as the optimal power allocation of the scalable video transmission over MIMO system 14.

With reference to FIGS. 1 and 2, wherein in encoding a video sequence into L layers 11, the scalable video encoding module 110 encodes the video sequence 300 into L layers, wherein the layers includes a base layer and L−1 enhancement layers. In this embodiment, the scalable video coding is based on H.264 SVC standard.

Next, referring to FIGS. 1 and 2, in performing modulation and coding schemes (MCSs) for each of the layers 12, each of the layers generates a bit error rate or a symbol error rate after performance of MCSs. In this embodiment, the way for performing modulation and coding schemes (MCSs) to each of the layers is selected from M-QAM, M-QAM with (N, K, N−K+1) RS codes or modulation and coding in each communication standard.

Thereafter, referring to FIGS. 1 and 2, in performing power allocations of sub-problems 13, power allocations of the L sub-problems are obtained by the bit error rate or the symbol error rate of each of the layers and derivative of the bit error rate or the symbol error rate of each of the layers respectively. In this embodiment, the power allocation of each of the sub-problems is obtained by dichotomy. With reference to FIG. 3, the procedures for obtaining power allocation of each of the sub-problems includes a set step 13a, a calculation step 13b, a first judgment step 13c and a second judgment step 13d.

With reference to FIG. 3, in the set step 13a, setting $p_k^*=0$, for k=1, 2, ... L, wherein $p_k^*$ is the power of each of the layers, and setting upper=min($g_k(1)$), for k= 1, 2, ..., l and lower=0, wherein upper is an upper boundary, lower is a lower boundary, $g_k(\bullet)$ is an auxiliary equation related to the bit error rate of each of the layers and derivative of the bit error rate of each of the layers, and l is up to the $l_{th}$ layer allowed for transmission in the sub-problem. In this embodiment, the auxiliary equation represents:

$$g_k(p_k)=\log(1+h_k(p_k)),$$

in which, $$h_k(p_k) = -\frac{1-Pe_k(p_k)}{s_k Pe'_k(p_k)},$$

wherein $Pe_k(p_k)$ is the bit error rate or the symbol error rate of the $k_{th}$ layer, $Pe_k'(p_k)$ is derivative of the bit error rate or the symbol error rate of the $k_{th}$ layer, wherein bit error rate or the symbol error rate and derivative of the bit error rate or the symbol error rate relate to mentioned method of modulation and coding schemes, $s_k$ is the total amount of bits or symbols of a single group of pictures (GOP) of the $k_{th}$ layer, wherein the auxiliary equation is set to be $\log(1+h_k(p_k))$ in order to avoid the limitation of numerical value when solving the optimized solution of the $l_{th}$ sub-problem.

With reference to FIG. 3, in the calculation step 13b, calculating $\mu=$(upper+lower)/2 and thereafter obtaining $p_k^*=g_k^{-1}(\mu)$, for k=1, 2, . . . , l by obtained $\mu$ for solving the optimized power of each of the layers in the sub-problem. Next, in the first judgment step 13c, judging whether a power-summarized discriminant $\Sigma_{k=1}^{l} p_k^* < 1$ hold or not, if yes, setting lower=$\mu$, if not, setting upper=$\mu$; next, performing the second judgment step 13d for judging whether an iterative conclusion discriminant $|\Sigma p_k^*-1|>\Delta$ hold or not, if yes, jumping to the calculation step and the first judgment step, if not, terminating and outputting the optimized power allocation of the corresponding sub-problem, wherein $\Delta$ is a judgment value. In this embodiment, the judgment value is set to be a positive number approaching zero such as 0.0001, wherein power allocation of each of the sub-problems is outputted as:

$$p_l^* = p_l^*/\|p_l^*\|_1, p_l^* = [p_1^*, p_2^*, \ldots p_l^*]$$

wherein $p_l^*$ is the optimized power-allocation matrix of the layers, and $\|\bullet\|_1$ is 1-1 norm.

Eventually, with reference to FIG. 2, among all of the candidate solutions obtained from the sub-problems, choosing the candidate solution with the largest quality of experiences as the optimal power allocation of the scalable video transmission over MIMO system 14, the power allocation of the scalable video transmission over MIMO system 100 is obtained by choosing one of the candidate solutions with the largest utility value (or equivalently, quality of experience), and the quality of experiences of each of the sub-problems is obtained by the optimized power allocation of each of the sub-problems from the above-mentioned procedures into the following equation:

$$\sum_{k=1}^{L} u_k \tilde{f}_k(p_l^*)$$

wherein $u_k$ is utility of the $k_{th}$ layer, $\tilde{f}_k(\bullet)$ is the frame correction rate of the $k_{th}$ layer, and $p_l^*$ is the optimized power allocation of the $l_{th}$ sub-problem.

Owing to the consideration of transmission error rate of PHY and video coding structure of APP in the present invention, and optimizing the quality of experiences at user end by design of cross-layer, the present invention may directly improve the quality of experiences at user end in scalable video transmission.

Figure 4:
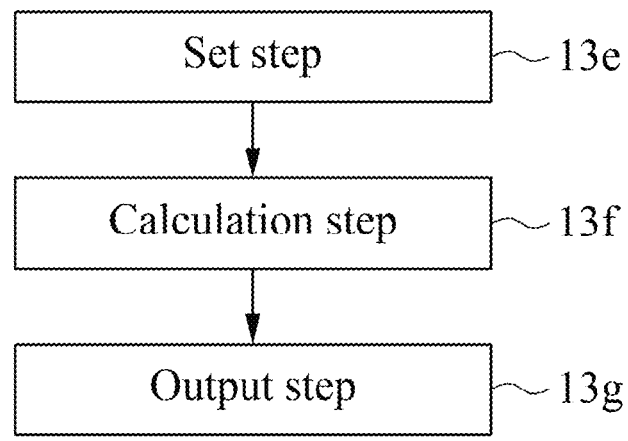
FIG. 4 is a flow chart illustrating a sub-problem of power allocation method in accordance with the second embodiment of the present invention.

A second embodiment of the present invention is shown in FIGS. 2 and 4, the primary difference between the second embodiment and the first embodiment is that the procedure of performing power allocations of sub-problems 13 is performed by method having lower complexity to proceed power allocation of each of the sub-problems. With reference to FIG. 4, in this embodiment, power allocation of each of the sub-problems includes: a set step 13e, a calculation step 13f and an output step 13g.

Referring to FIG. 4, in the set step 13e, setting $p_k^*=0$, for k=1, 2, . . . L, wherein $p_k^*$ is the power of each of the layers, setting $\mu=\min(g_k(1))$, for k=1, 2, . . . , l, wherein $g_k(\bullet)$ is a auxiliary equation related to the bit error rate of each of the layers and the derivative of the bit error rate of each of the layers, and l is the $l_{th}$ layer allowed for transmission in the sub-problem. In this embodiment, the auxiliary equation represents:

$$g_k(p_k)=\log(1+h_k(p_k)),$$

in which, $$h_k(p_k) = -\frac{1-Pe_k(p_k)}{s_k Pe'_k(p_k)},$$

wherein $Pe_k(p_k)$ is the bit error rate or the symbol error rate of the $k_{th}$ layer, $Pe_k'(p_k)$ is the derivative of bit error rate or the symbol error rate of the $k_{th}$ layer, and $s_k$ is the total amount of bits or symbols of single group of pictures of the $k_{th}$ layer.

With reference to FIG. 4, in the calculation step 13f, solving $p_k=g_k^{-1}(\mu)$, for k=1, 2, . . . , l by $\mu$ to obtain the power of each of the layers within the sub-problem, wherein $p_k$ is the power of the $k_{th}$ layer. Next, in the output step 13g, outputting the optimized power allocation of each of the sub-problems, in this embodiment, the optimized power allocation of each of the sub-problems represents:

$$p_l^* = p_l/\|p_l\|_1, p_l = [p_1, p_2, \ldots p_l]$$

wherein $p_l^*$ is the optimal power-allocation matrix, and $\|\bullet\|_1$ is 1-1 norm.

Referring to FIG. 2, equally in this embodiment, in among all of the candidate solutions obtained from the sub-problems, the candidate solution with the largest quality of experiences is selected as the optimal power allocation of the scalable video transmission over MIMO system 14, the power allocation of the scalable video transmission over the MIMO system is obtained by choosing one of the candidate solutions with largest utility value (or equivalently, quality of experience), and the quality of experiences of each of the sub-problems is obtained by substituting the optimized power allocation of each of the sub-problems from the above-mentioned procedures into the following equation:

$$\sum_{k=1}^{L} u_k \tilde{f}_k(p_l^*)$$

wherein $u_k$ is utility of the $k_{th}$ layer, $\tilde{f}_k(\bullet)$ is the frame correction rate of the $k_{th}$ layer, and $p_l^*$ is the optimized power allocation of the $l_{th}$ sub-problem.

Figure 6:
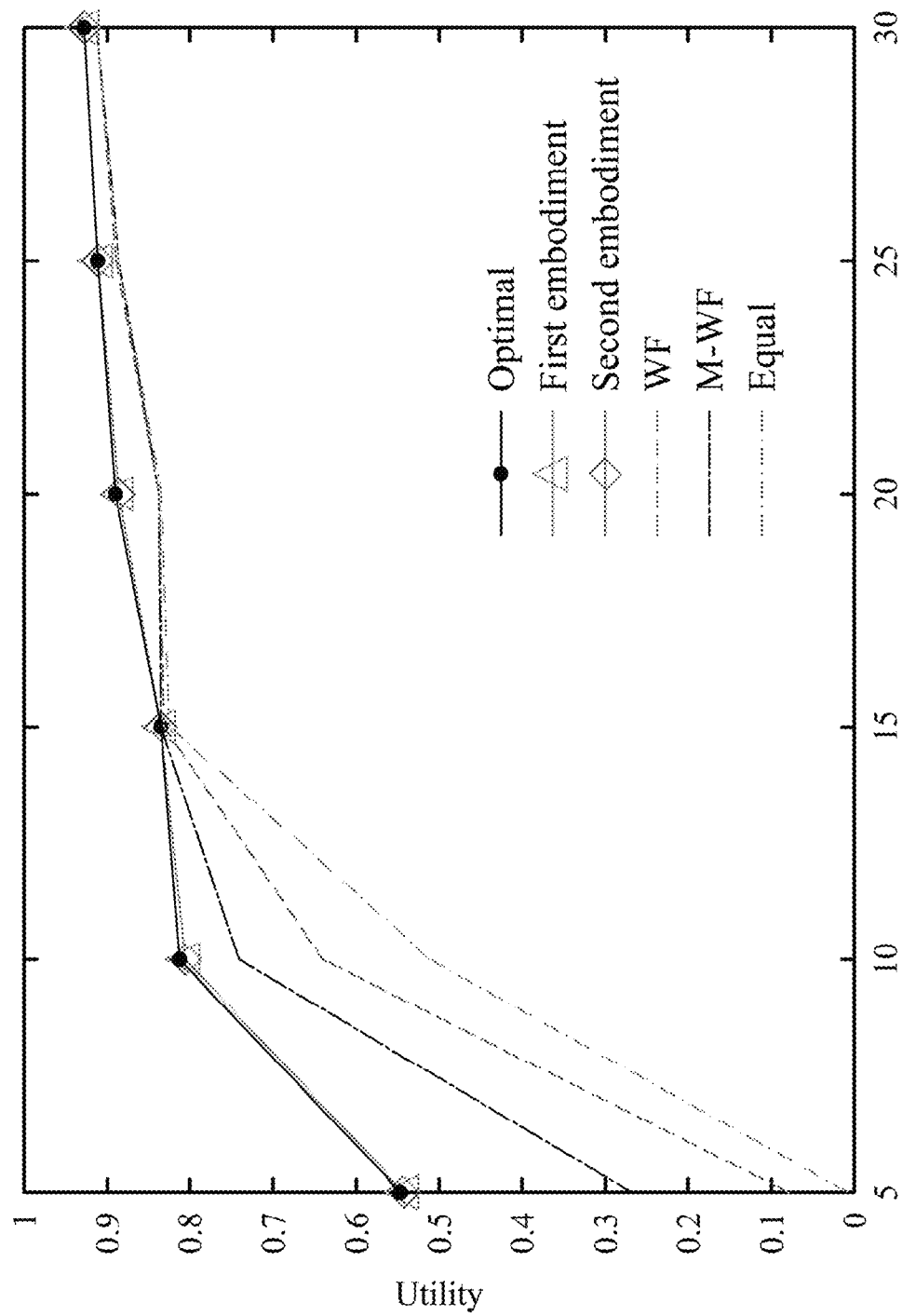
FIG. 6 is a comparison Figure of actual application between the present invention and prior art.

A comparison diagram between the present invention and prior art is shown in FIG. 6, indicating that the present invention and prior art both proceed system utility of signal transmission (quality of experiences at user end) to a video sequence by way of M-QAM. In FIG. 6, the optimized solution is calculated by time-wasted exhaustive search method, WF is water-filling algorithm, and M-WF is modified water-filling algorithm. From the Figure, we notice that when the first embodiment and the second embodiment of the present invention proceed transmission, the system utility of the first embodiment and the second embodiment is near to the optimized solution and surpasses WF, M-WF and equal power allocation in prior art. We learned that power allocation of the scalable video transmission over MIMO system in the present invention could indeed optimize the quality of experiences at user end.

Figure 7:
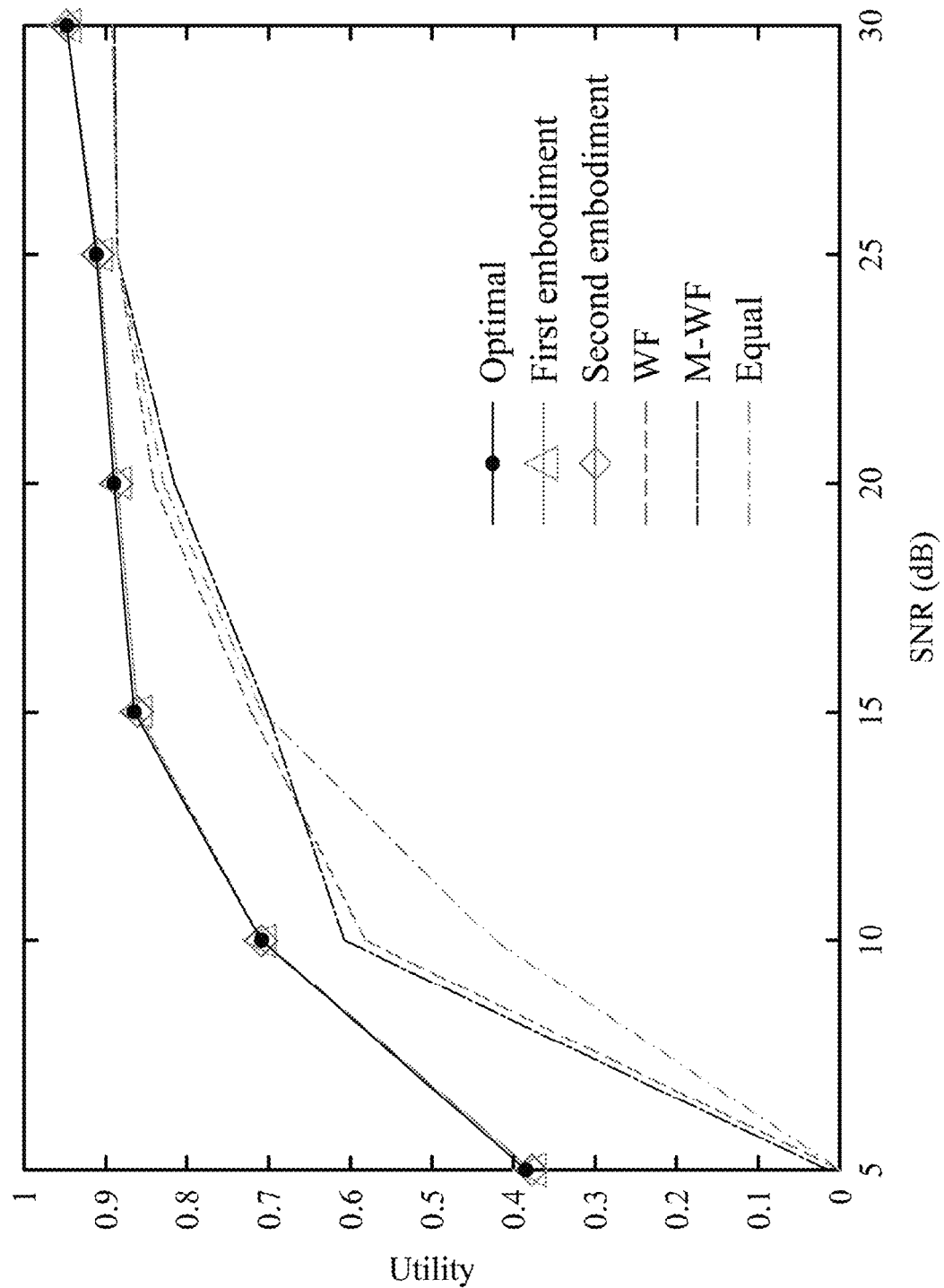
FIG. 7 is a comparison Figure of actual application between the present invention and prior art.

A comparison diagram between the present invention and prior art is shown in FIG. 7, indicating that the present invention and prior art both proceed system utility of signal transmission (quality of experiences at user end) to a video sequence by way of M-QAM with (N, K, N−K+1) RS codes over GF($2^n$). From FIG. 7, we notice that when the first embodiment and the second embodiment of the present invention proceed transmission, the system utility of the first embodiment and the second embodiment is near to the optimized solution and surpasses WF, M-WF and equal power allocation in prior art. We learned that the power allocation of the scalable video transmission over MIMO system in the present invention could indeed optimize the quality of experiences at user end.

Figure 8:
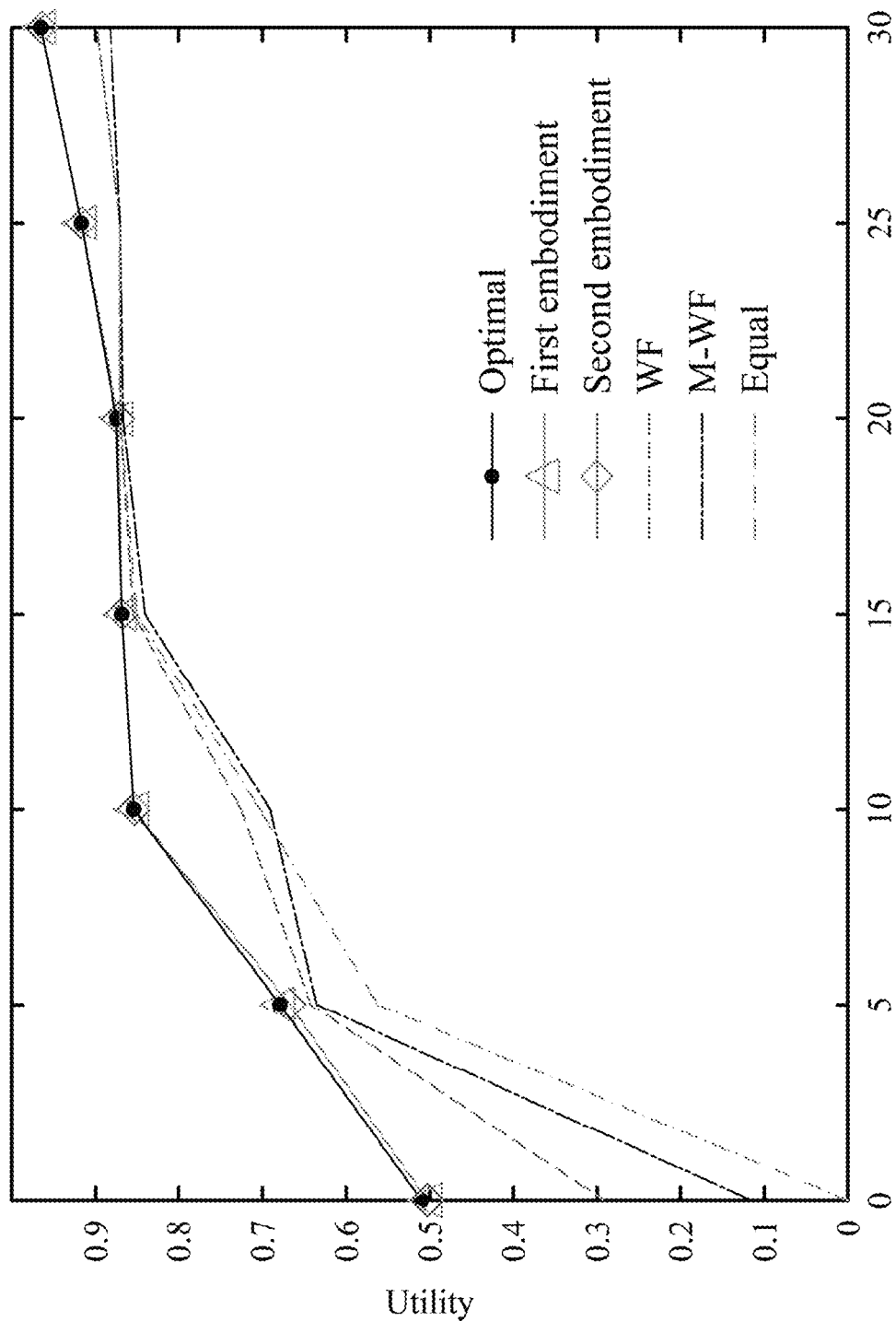
FIG. 8 is a comparison Figure of actual application between the present invention and prior art.

A comparison diagram between the present invention and prior art is shown in FIG. 8, indicating that the present invention and prior art both proceed system utility of signal transmission (quality of experiences at user end) to a video sequence by way of modulation and coding schemes in communication standards. From FIG. 8, we notice that when the first embodiment and the second embodiment of the present invention proceed transmission, the system utility of the first embodiment and the second embodiment is near to the optimized solution and surpasses WF, M-WF and equal power allocation in prior art. We learned that the power allocation of the scalable video transmission over MIMO system in the present invention could indeed optimize the quality of experiences at user end.

The present invention considers both transmission-error-rate of PHY layer and video coding structure of APP layer and optimizes quality of experiences (QoEs) at user end with cross-layer design. Besides, due to the complexity of the primary optimization problem, the power-allocation method for the scalable video transmission over MIMO system decomposes the original primary problem into several sub-problems, each of which can be solved by classical convex optimization methods. The candidate solution set can be obtained by solving the sub-problems and the optimal solution of the original problem is found by choosing the best candidate solution with the largest system utility. Eventually, making power allocation of the sub-problem with the largest system utility as the power allocation of the system. And the utility of the system is therefore optimized. In addition, the issue of the complexity of the primary optimization problem can be effectively solved in the present invention.

While this invention has been particularly illustrated and described in detail with respect to the preferred embodiments thereof, it will be clearly understood by those skilled in the art that is not limited to the specific features shown and described and various modified and changed in form and details may be made without departing from the spirit and scope of this invention.

What is claimed is:

1. A power-allocation method for transmitting scalable video over a MIMO system includes:
   encoding a video sequence into L layers;
   performing modulation and coding schemes (MCSs) to the layers and generating a bit error rate or a symbol error rate respectively for each of the layers after MCSs procedure;
   decomposing an optimized power allocation problem into L sub-power allocation problems and obtaining a candidate power allocation solution set by solving each of the sub-power allocation problems respectively based on the bit error rate or the symbol error rate of each of the layers and derivative of the bit error rate or the symbol error rate of each of the layers, wherein each of the sub-power allocation problems allows up to l(l=1, 2, . . . , L) layers to proceed transmission respectively; and
   selecting the candidate power allocation solution set with a largest quality of experiences as the optimized power allocation solution of the scalable video transmission over the MIMO system, wherein the expression of the optimized power allocation of the scalable video transmission over the MIMO system is:

$$p^* = \operatorname*{argmax}_{\{p_1^*, \ldots, p_l^*, \ldots p_L^*\}} \sum_{k=1}^{L} u_k \tilde{f}_k(p_l^*),$$

wherein $p^*$ is the optimized power allocation of the scalable video transmission over the MIMO system, $u_k$ is utility of the $k_{th}$ layer, $\tilde{f}_k(\bullet)$ is the frame correction rate of the $k_{th}$ layer, and $p_l^*$ is the candidate power allocation solution set of the $l_{th}$ sub-power allocation problem.

2. The power-allocation method for transmitting scalable video over the MIMO system in accordance with claim 1, wherein the candidate power allocation set of each of the sub-power allocation problems is obtained by dichotomy.

3. The power-allocation method for transmitting scalable video over the MIMO system in accordance with claim 2, wherein the procedures for obtaining the candidate power allocation set of each of the sub-power allocation problems includes:
   a set step for setting $p_k^*=0$, for k=1, 2, . . . L, upper=min ($g_k(1)$), for k=1, 2, . . . , l and lower=0, wherein $p_k^*$ is the power of each of the layers, upper is an upper boundary, lower is a lower boundary, $g_k(\bullet)$ is an auxiliary equation related to the bit error rate of each of the layers and derivative of the bit error rate of each of the layers, and l is up to the $l_{th}$ layer allowed for transmission in the sub-power allocation problem;
   a calculation step for calculating μ=(upper+lower)/2 and thereafter solving $p_k^* = g_k^{-1}(\mu)$, for k=1, 2, . . . , l by obtained μ;
   a first judgment step for judging whether a power-summarized discriminant $\Sigma_{k=1}^{l} p_k^* < 1$ hold or not, if yes, setting lower=μ, if not, setting upper=μ; and a second judgment step for judging whether an iterative conclusion discriminant $|\Sigma p_k^* - 1| > \Delta$ A hold or not, if yes, jumping to the calculation step and the first judgment step, if not, terminating and outputting the optimized power allocation of each of the sub-power allocation problems, wherein Δ is a judgment value.

4. The power-allocation method for transmitting scalable video over the MIMO system in accordance with claim 3, wherein the optimized power allocation of each of the sub-power allocation problems in the second judgment step is outputted as: $p_l^* = p_l^*/\|p_l^*\|_l, p_l^* = [p_1^*, p_2^*, \ldots p_l^*]$, wherein $p_l^*$ is the candidate power-allocation solution set of the layers, and $\|\bullet\bullet\|_l$ is 1-1 norm.

5. The power-allocation method for transmitting scalable video over the MIMO system in accordance with claim 3, wherein $g_k(p_k) = \log(1 + h_k(p_k))$, $$h_k(p_k) = -\frac{1 - Pe_k(p_k)}{s_k Pe_k'(p_k)},$$

wherein $Pe_k(p_k)$ is the bit error rate or the symbol error rate of the $k_{th}$ layer, $Pe_k'(p_k)$ is derivative of the bit error rate or the symbol error rate of the $k_{th}$ layer, $s_k$ is the total amount of bits or symbols of a single group of pictures (GOP) of the $k_{th}$ layer.

6. The power-allocation method for transmitting scalable video over the MIMO system in accordance with claim 5, wherein each of the layers is modulated by M-QAM (Quadrature Amplitude Modulation), the bit error rate for each of the layers modulated by M-QAM represents:

$$Pe_k(p_k) \approx \frac{2(1 - M_k^{-0.5})}{\log_2(\sqrt{M_k})} \left(1 - \Phi\left(\sqrt{\left(\frac{3}{M_k - 1}\right)\rho\lambda_k p_k}\right)\right),$$

wherein $M_k$ is the constellation-point number of the $k_{th}$ layer, $\Phi(\bullet)$ is the cumulative distribution function, $\rho\lambda_k$ is the channel gain of the $k_{th}$ layer, and derivative of the bit error rate for each of the layers modulated by M-QAM represents:

$$Pe_k'(p_k) \approx -\frac{(1 - M_k^{-0.5})e^{-\frac{3\rho\lambda_k p_k}{2(M_k - 1)}}}{\log_2(\sqrt{M_k})} \sqrt{\frac{3\rho\lambda_k}{2\pi(M_k - 1)p_k}}.$$

7. The power-allocation method for transmitting scalable video over the MIMO system in accordance with claim 5, wherein each of the layers proceed modulation and coding schemes by M-QAM with (N, K, N-K+1) Reed-Solomon code over Galois field($2^n$), wherein N is the block length, K is the message length, N-K+1 is the minimum Hamming distance, and the symbol error rate for each of the layers proceeding MCSs procedure by M-QAM with (N, K, N-K+1) Reed-Solomon code over Galois field($2^n$) represents:

$$Pe_k(p_k) = \frac{1}{N}\sum_{i=t+1}^{N} i\binom{N}{i}(P_{M_k}(p_k))^i(1 - P_{M_k}(p_k))^{N-i}$$

$$P_{M_k}(p_k) = 1 - \left(1 - 2(1 - M_k^{-0.5})Q\left(\sqrt{\frac{3\rho\lambda_k p_k}{M_k - 1}}\right)\right)^{\frac{2n}{\log_2(M_k)}}$$

wherein $M_k$ is the constellation-point number of the $k_{th}$ layer, $\rho\lambda_k$ is the channel gain of the $k_{th}$ layer, $t=(N-K)/2$, and $Q(\bullet)$ is the complementary error function, wherein derivative of the symbol error rate for each of the layers proceeding MCSs procedure by M-QAM with (N, K, N-K+1) Reed-Solomon code over Galois field($2^n$) represents:

$$Pe_k'(p_k) = \sum_{j=t}^{N-1} \frac{P'_{M_k}(p_k)\binom{N-1}{j}(j+1-NP_{M_k}(p_k))}{(1-P_{M_k}(p_k))^{j-N+2}P_{M_k}(p_k)^{-j}},$$

$$P'_{M_k}(p_k) = \frac{2nPs_k'(p_k)(1-Ps_k(p_k))^{\frac{2n}{\log_2(M_k)}-1}}{\log_2(M_k)},$$

$$Ps_k'(p_k) = -(1 - M_k^{-0.5})e^{\frac{3\rho\lambda_k p_k}{2(M_k-1)}}\sqrt{\frac{3\rho\lambda_k}{2\pi(M_k-1)p_k}},$$

$$Ps_k(p_k) = 2(1 - M_k^{-0.5})Q\left(\sqrt{\frac{3\rho\lambda_k p_k}{M_k - 1}}\right).$$

8. The power-allocation method for transmitting scalable video over the MIMO system in accordance with claim 5, wherein the communication standard is selectable from 3GPP, HIPERLAN/2, IEEE 802.11a or IEEE 802.16, wherein each of the layers proceeds modulation and coding schemes by combinations of the communication standards, and the bit error rate for each of the layers proceeding MCSs procedure by combinations of the communication standards represents: $Pe_k(p_k) = a_k e^{-b_k \rho \lambda_k p_k}$, wherein $a_k$ and $b_k$ are coefficients related to modulation and coding schemes (MCSs) used by the $k_{th}$ layer, $\rho\lambda_k$ is the channel gain of the $k_{th}$ layer, wherein derivative of the bit error rate for each of the layers proceeding MCSs procedure by modulation and coding schemes in each communication standard represents: $Pe_k'(p_k) = -a_k b_k \rho \lambda_k e^{-b_k \rho \lambda_k p_k}$.

9. The power-allocation method for transmitting scalable video over the MIMO system in accordance with claim 1, wherein power allocation of each of the sub-power allocation problems includes:
 a set step for setting $p_k^* = 0$, for $k=1, 2, \ldots L$ and $\mu = \min(g_k(1))$, for $k=1, 2, \ldots, l$, wherein $p_k^*$ is the power of each of the layers, $g_k(\bullet)$ is an auxiliary equation related to the bit error rate of each of the layers and the derivative of the bit error rate of each of the layers, and l is the $l_{th}$ layer allowed for transmission in the sub-power allocation problem;
 a calculation step for solving $p_k = g_k^{-1}(\mu)$, for $k=1, 2, \ldots, l$ via $\mu$, wherein $p_k$ is the power of the $k_{th}$ layer; and
 an output step for outputting the optimized power allocation of each of the sub-power allocation problems.

10. The power-allocation method for transmitting scalable video over the MIMO system in accordance with claim 9, wherein in the output step, the optimized power allocation of each of the sub-power allocation problems represents: $p_l^* = p_l/\|p_l\|_1$, $p_l = [p_1, p_2, \ldots p_l]$, wherein $p_l^*$ is the candidate power-allocation set of the $l_{th}$ sub-power allocation problem, and $\|\bullet\|_1$ is 1-1 norm.

11. The power-allocation method for transmitting scalable video over the MIMO system in accordance with claim 9, wherein $g_k(p_k) = \log(1 + h_k(p_k))$, $$h_k(p_k) = -\frac{1 - Pe_k(p_k)}{s_k Pe_k'(p_k)},$$

wherein $Pe_k(p_k)$ is the bit error rate or the symbol error rate of the $k_{th}$ layer, $Pe_k'(p_k)$ is derivative of the bit error rate or the symbol error rate of the $k_{th}$ layer, and $s_k$ is the total amount of bits or symbols of single group of pictures of the $k_{th}$ layer.

12. The power-allocation method for transmitting scalable video over the MIMO system in accordance with claim 11, wherein each of the layers is modulated by M-QAM (Quadrature Amplitude Modulation), the bit error rate for each of the layers modulated by M-QAM represents:

$$Pe_k(p_k) \approx \frac{2(1 - M_k^{-0.5})}{\log_2(\sqrt{M_k})}\left(1 - \Phi\left(\sqrt{\left(\frac{3}{M_k - 1}\right)\rho\lambda_k p_k}\right)\right),$$

wherein $M_k$ is the constellation-point number of the $k_{th}$ layer, $\Phi(\bullet)$ is the cumulative distribution function, $p\lambda_k$ is the channel gain of the $k_{th}$ layer, and the derivative of the bit error rate for each of the layers modulated by M-QAM represents:

$$Pe_k'(p_k) \approx -\frac{(1 - M_k^{-0.5})e^{-\frac{3\rho\lambda_k p_k}{2(M_k - 1)}}}{\log_2(\sqrt{M_k})}\sqrt{\frac{3\rho\lambda_k}{2\pi(M_k - 1)p_k}}.$$

13. The power-allocation method for transmitting scalable video over the MIMO system in accordance with claim 11, wherein each of the layers proceeds modulation and coding schemes (MCSs) by M-QAM with (N, K, N-K+1) Reed-Solomon code over Galois field($2^n$), wherein N is the block length, K is the message length, N-K+1 is the minimum Hamming distance, the symbol error rate for each of the layers proceeding MCSs procedure by M-QAM with (N, K, N-K+1) Reed-Solomon codes over Galois field($2^n$) represents:

$$Pe_k(p_k) = \frac{1}{N}\sum_{i=t+1}^{N} i \binom{N}{i}(P_{M_k}(p_k))^i(1 - P_{M_k}(p_k))^{N-i},$$

$$P_{M_k}(p_k) = 1 - \left(1 - 2(1 - M_k^{-0.5})Q\left(\sqrt{\frac{3\rho\lambda_k p_k}{M_k - 1}}\right)\right)^{\frac{2n}{\log_2(M_k)}},$$

wherein $M_k$ is the constellation-point number of the $k_{th}$ layer, $p\lambda_k$ is the channel gain of the $k_{th}$ layer, t=(N−K)/2, and Q($\bullet$) is the complementary error function, wherein derivative of the symbol error rate for each of the layers modulated by M-QAM with (N, K, N-K+1) Reed-Solomon code over Galois field($2^n$) represents:

$$Pe_k'(p_k) = \sum_{j=t}^{N-1} \frac{P'_{M_k}(p_k)\binom{N-1}{j}(j + 1 - NP_{M_k}(p_k))}{(1 - P_{M_k}(p_k))^{j-N+2}P_{M_k}(p_k)^{-j}},$$

$$P'_{M_k}(p_k) = \frac{2nPs_k'(p_k)(1 - Ps_k(p_k))^{\frac{2n}{\log_2(M_k)}-1}}{\log_2(M_k)},$$

$$Ps_k'(p_k) = -(1 - M_k^{-0.5})e^{\frac{3\rho\lambda_k p_k}{2(M_k-1)}}\sqrt{\frac{3\rho\lambda_k}{2\pi(M_k - 1)p_k}},$$

$$Ps_k(p_k) = 2(1 - M_k^{-0.5})Q\left(\sqrt{\frac{3\rho\lambda_k p_k}{M_k - 1}}\right).$$

14. The power-allocation method for transmitting scalable video over the MIMO system in accordance with claim 11, wherein the communication standard is selectable from 3GPP, HIPERLAN/2, IEEE 802.11a or IEEE 802.16, wherein each of the layers proceeds modulation and coding schemes by modulation and coding in each communication standard, the bit error rate for each of the layers proceeding MOSS procedure by combinations of the communication standards represents: $Pe_k(p_k) = a_k e^{-b_k p\lambda_k p_k}$, wherein $a_k$ and $b_k$ are coefficients related to modulation and coding schemes (MCSs) used by the $k_{th}$ layer, $p\lambda_k$ is the channel gain of the $k_{th}$ layer, wherein the derivative of the bit error rate for each of the layers by modulation and coding in each communication standard represents: $Pe_k'(p_k) = -a_k b_k p\lambda_k e^{-b_k p\lambda_k p_k}$.

* * * * *